United States Patent
Westhoff et al.

(10) Patent No.: US 8,794,639 B2
(45) Date of Patent: Aug. 5, 2014

(54) SEALING ASSEMBLY HAVING LIQUID-FILLED SEAL

(75) Inventors: James A. Westhoff, Langhorne, PA (US); James A. Kelly, Upper Black Eddy, PA (US); Christopher Handago, Plymouth Meeting, PA (US)

(73) Assignee: A-LOK Products, Inc., Tullytown, PA (US)

( * ) Notice: Subject to any disclaimer, the term of this patent is extended or adjusted under 35 U.S.C. 154(b) by 492 days.

(21) Appl. No.: 12/637,433

(22) Filed: Dec. 14, 2009

(65) Prior Publication Data

US 2010/0148452 A1     Jun. 17, 2010

Related U.S. Application Data

(60) Provisional application No. 61/122,976, filed on Dec. 16, 2008.

(51) Int. Cl.

| | |
|---|---|
| F16J 15/46 | (2006.01) |
| F16L 5/02 | (2006.01) |
| F16L 17/00 | (2006.01) |
| F16L 21/02 | (2006.01) |
| F16L 33/16 | (2006.01) |
| H02G 3/22 | (2006.01) |
| H02G 15/04 | (2006.01) |
| H02G 15/013 | (2006.01) |
| F16J 15/02 | (2006.01) |
| F16J 15/48 | (2006.01) |
| F16J 15/10 | (2006.01) |

(52) U.S. Cl.
CPC ............... *F16J 15/027* (2013.01); *F16J 15/46* (2013.01); *F16J 15/48* (2013.01); *F16J 15/104* (2013.01); *F16L 21/02* (2013.01); *F16L 17/00* (2013.01)

USPC .................. 277/645; 277/605; 277/617

(58) Field of Classification Search
USPC ................ 277/605, 645, 553, 652, 617
See application file for complete search history.

(56) References Cited

U.S. PATENT DOCUMENTS

| | | | |
|---|---|---|---|
| 829,546 A | 8/1906 | Schou | |
| 1,966,202 A | 7/1934 | Pfefferle | |
| 3,642,291 A * | 2/1972 | Zeffer et al. | 277/583 |
| 4,159,829 A * | 7/1979 | Ditcher | 277/605 |
| 4,269,419 A * | 5/1981 | Brant | 277/605 |
| 4,300,775 A * | 11/1981 | Ringel | 277/589 |
| 4,449,720 A * | 5/1984 | Wolters et al. | 277/625 |
| 4,508,355 A * | 4/1985 | Ditcher | 277/605 |
| 4,809,994 A * | 3/1989 | Skinner et al. | 277/606 |
| 5,114,162 A * | 5/1992 | Ditcher | 277/605 |
| 5,217,237 A * | 6/1993 | Westhoff et al. | 277/605 |
| RE34,787 E * | 11/1994 | Westhoff et al. | 277/605 |
| 5,580,068 A | 12/1996 | Gundy | |
| 5,687,976 A * | 11/1997 | Andrick et al. | 277/607 |

(Continued)

*Primary Examiner* — Vishal Patel
*Assistant Examiner* — Nicholas L Foster
(74) *Attorney, Agent, or Firm* — Fay Sharpe LLP

(57) ABSTRACT

A sealing assembly for a liquid conveying system includes a first structure defining an aperture, such as a pipe receiving aperture. A second structure, such as a pipe is received in the aperture. And an annular seal is disposed within the aperture for radially sealing between the first structure and the second structure. The seal includes an outer radial portion embedded in the first structure and an inner radial portion in sealing engagement with the second structure. The inner radial portion defines an internal cavity containing a substantially incompressible fluid or gel that is movable within the cavity to provide a dynamic seal with the second structure.

18 Claims, 9 Drawing Sheets

(56) References Cited

U.S. PATENT DOCUMENTS

| | | | |
|---|---|---|---|
| 5,826,887 A | 10/1998 | Neumann et al. | |
| 5,997,006 A * | 12/1999 | Westhoff et al. | 277/604 |
| 6,126,173 A * | 10/2000 | Westhoff et al. | 277/615 |
| 6,328,310 B1 * | 12/2001 | Chikaraishi | 277/314 |
| 6,481,927 B2 | 11/2002 | Rhodes | |
| 6,581,938 B2 * | 6/2003 | McKenrick | 277/314 |
| 6,702,301 B1 | 3/2004 | Davies et al. | |
| 6,719,302 B2 * | 4/2004 | Andrick | 277/604 |
| 7,922,179 B2 * | 4/2011 | Andrick et al. | 277/615 |
| 2012/0025471 A1 * | 2/2012 | Andrick et al. | 277/314 |

* cited by examiner

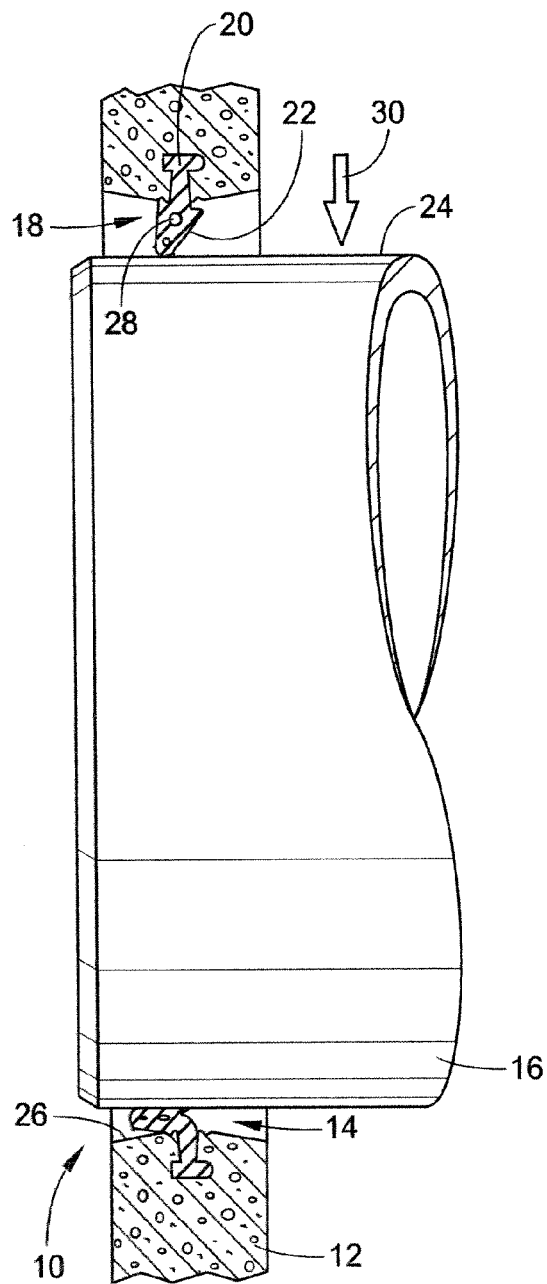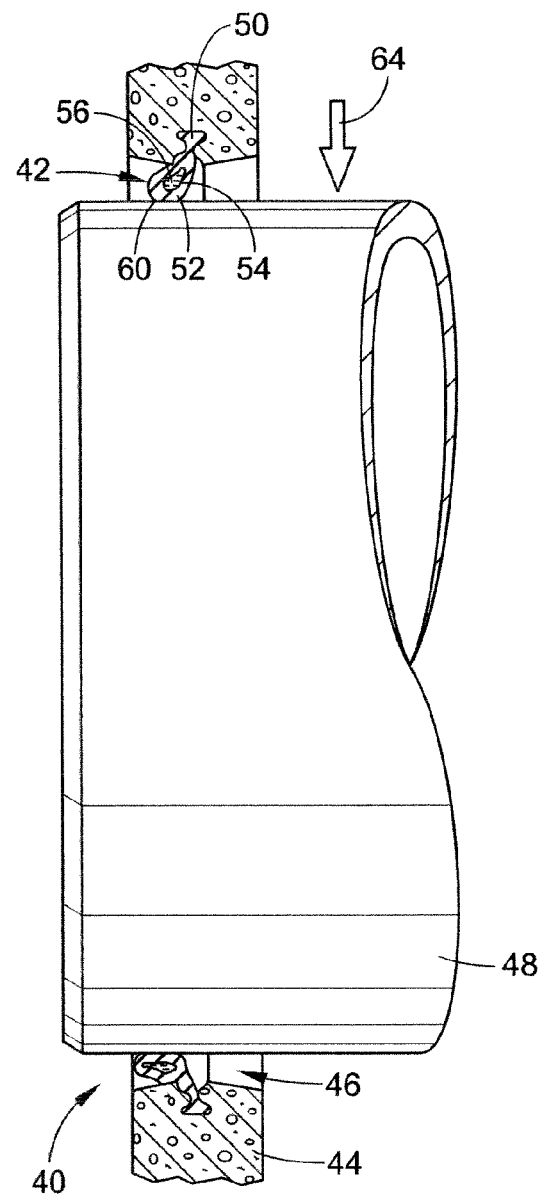
FIG. 1
(PRIOR ART)
FIG. 2

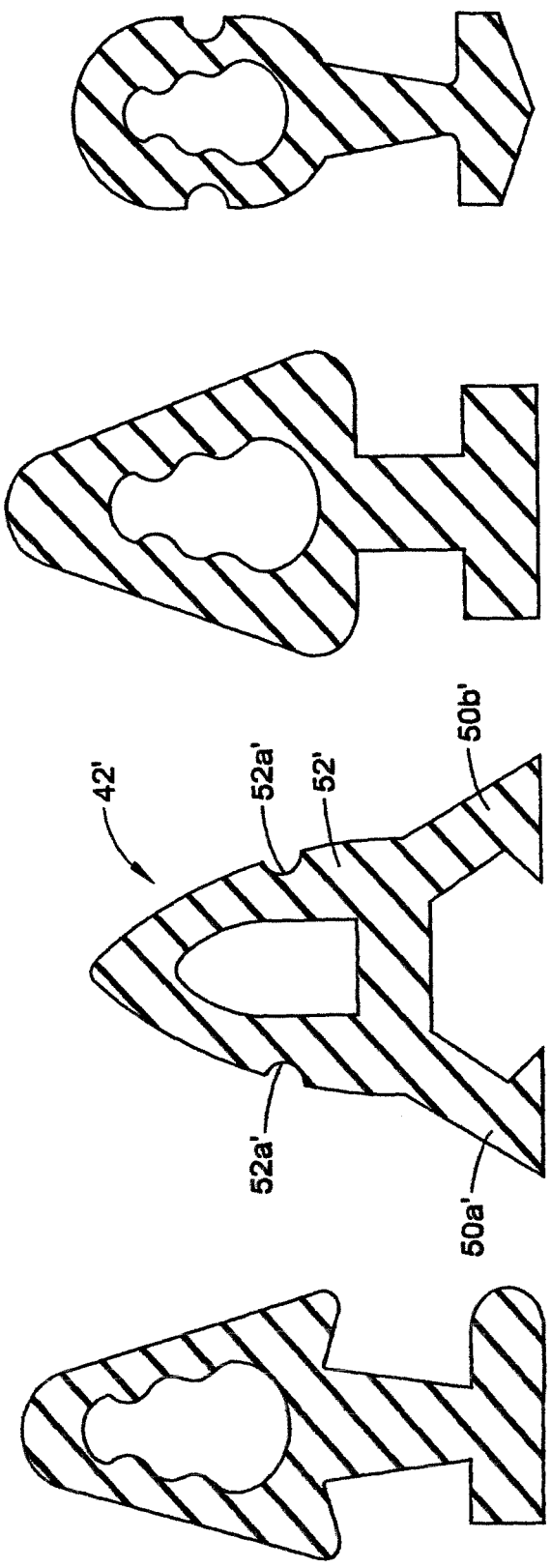

SEALING ASSEMBLY HAVING LIQUID-FILLED SEAL

BACKGROUND

Applicant claims priority from U.S. Provisional Application Ser. No. 61/122,976 which was filed on Dec. 16, 2008. That application is incorporated by reference hereinto in its entirety.

The present disclosure relates to gasket or seal assemblies for use in providing a liquid tight seal between an opening in a structure and a pipe. More particularly, the present disclose relates to a sealing assembly having a liquid-filled seal for sealing between an associated structure (e.g., a concrete structure, a manhole, a wet well, etc.) and a liquid-carrying pipe, which provides a dynamic seal with the pipe.

Compression-type connectors or seals, such as those made of rubber or other resilient materials, have been used for many years in sanitary and storm sewer construction for providing a water tight connection between pipes and various sewer or storm structures, and particularly concrete structures such as manholes, wet wells, and other structures used in water conveyance systems. Various types and designs of connectors and seals have been employed over these many years for purposes of improving the water tight performance and sealing characteristics. Despite many advances, compression designs continue to be challenged when used in association with a pipe (whether made of concrete, plastic, iron or other known materials) that can vary beyond tolerances and/or the sealing tolerance of the connector or seal employed with it.

There are two standard techniques typically used when mounting a conventional compression-type seal within an opening in a water conveying structure or member. In a first technique, one radial end of the seal is embedded in the conveying structure when the structure is formed in a casting operation. As such, the seal is integrally joined to the cast member during the casting operation as the cast member is being formed, for example, at a production facility. The second technique is to mount the seal into a recess, such as a groove, formed in a sidewall of the cast member. The opening can be formed either during the casting operation or through a coring operation that occurs after casting but before installation of the seal. In either case, after attachment of the seal to the cast member, the cast member is ready to receive a pipe. An inner radial portion of the seal serves as the pipe engaging portion, the pipe being inserted into the seal so that the pipe engaging portion encircles the exterior surface of the pipe.

The profiles of such seals have heretofore been either solid or defining empty cavities to produce a mechanical softness that reduces the coupling force required (i.e., the force required to insert the pipe into the seal) and enhances the sealing surface characteristics. These conventional profiles have been very effective at sealing with the pipe when a smooth, uniform and concentric outside diameter is provided on the pipe, as is often found when the pipe is formed of materials such as reinforced concrete, ductile iron, spun fiberglass, clay pipe materials, etc. These types of seals have also been adequate for use with flexible pipe, such as PVC or PE, but only where the pipe maintains a smooth and uniform diameter, and also has been properly bedded relative to the cast member so that the outside dimension of the pipe does not change or deflect over time due to movement, such as ground settlement. Another problem occurs when the pipe is oversized in relation to the opening defined in a concrete structure, such as water conveying structure or member. To remedy this problem, a particularly flexible seal is required.

Conventional designs typically rely on deflection of a rubber or resilient profile within a defined annular space to effect the seal between the outside diameter of the pipe and the inside surface of a structural opening, such as a concrete structure. However, flexible piping materials are being used more and more in direct burial applications in large sizes, such as those exceeding 48 inches in diameter. Also, the criteria specified in ASTM F2510 standard allows for a 5% deflection. This can create the reality of an installation exceeding the connector or seal tolerance. Conventional designs typically suffer a loss of compression when the pipe exceeds a +/−0.25 inch tolerance, which can create a failure requiring a repair or re-excavation. Loss of compression is a particular problem when undersized pipes or piping materials are utilized.

As can be appreciated, this places a large responsibility on the installer requiring him or her to take adequate steps to minimize any long-term deflection in the outside diameter of the flexible pipe material. Moreover, in situations where the pipe does not exhibit a good sealing surface, a dimension within acceptable tolerances, or creeps beyond the sealing limits of a particular seal or connector, a leak is more likely to develop over time. In these situations, conventional extrusion or molded seals for precast members do not always exhibit proper sealing characteristics, particularly over time.

Also, due to the quarter inch tolerance used for most conventional compression connectors or seals, the seal itself and the equipment designed to hold the seal in position during the casting of structures, such as concrete structures, is required to be very exact and is usually available in 0.50" (half inch) increments. Accordingly, having an inventory covering a full range of sizes from 1.00 inch through over 100.00 inches adversely leads to large inventory related costs.

SUMMARY

According to one aspect of the disclosure, a continuous seal is provided for sealing between a first associated member and a second associated member. More particularly, in accordance with this aspect, the annular seal includes a first radial portion embedded in the first associated member. A second radial portion of the seal protrudes away from the first associated member. A cavity is defined within the seal second radial portion. A fluid or gel is disposed with the cavity and is movable within the cavity to provide a dynamic seal with the second associated member.

According to another aspect of the disclosure, an improved sealing assembly for a liquid conveying system is provided. More particularly, in accordance with this aspect, the sealing assembly includes a structure defining a conduit receiving aperture and a conduit received in the aperture. An annular seal is disposed within the aperture for radially sealing between the structure and the conduit. The seal includes an outer radial portion embedded in the structure and an inner radial portion in sealing engagement with the conduit. The inner radial portion defines an internal cavity containing a substantially incompressible fluid or gel.

According to still another aspect of the disclosure, an improved method of making a sealing assembly for a liquid conveying system is provided. More particularly, in accordance with this aspect, a structure is cast having a hole defined therethrough. An annular seal, including a cavity defined in an inner radial portion thereof, is provided. A substantially incompressible fluid or gel is introduced within the cavity. A radial outer portion of the annual seal is embedded in the structure so that it surrounds the hole. The inner radial portion extends radially inwardly.

BRIEF DESCRIPTION OF THE DRAWINGS

FIG. 1 is a schematic view, partially in cross section, of a prior art annular seal partially embedded in a wastewater structure for sealing with a pipe received in an aperture of the wastewater structure.

FIG. 2 is a schematic view, partially in cross section, of an improved annular seal according to the present disclosure partially embedded in a wastewater structure for sealing with a pipe received in an aperture defined in the wastewater structure.

FIGS. 7A-7G are cross sectional views of alternate embodiments of annular seals according to the present disclosure for sealing between wastewater structures and pipes received therein.

DETAILED DESCRIPTION

Figure 3:
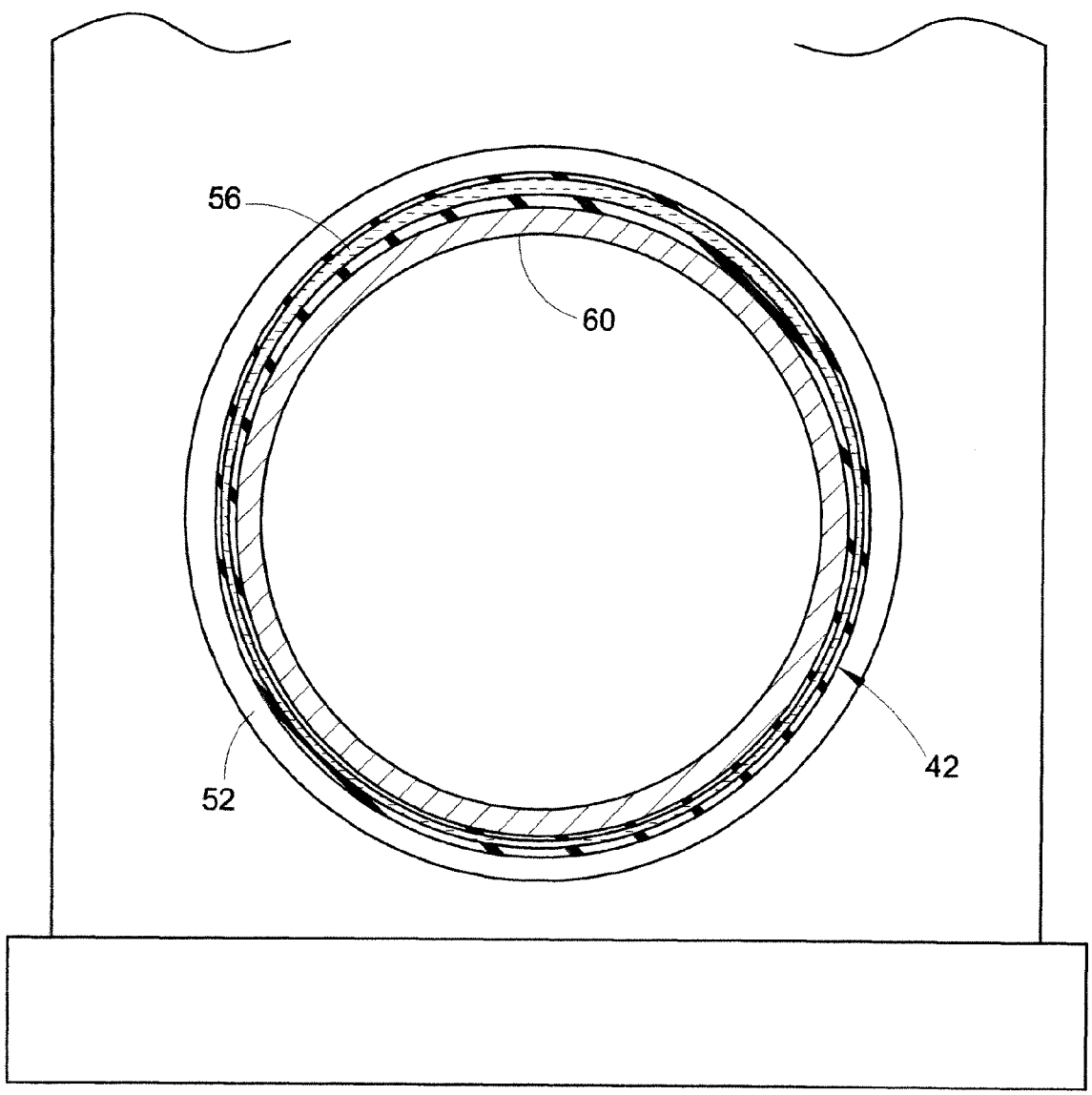
FIG. 3 is a schematic and elevational view of the improved annular seal shown with a fluid or gel moving within a cavity of the seal to an upper portion thereof to provide a dynamic seal with the pipe.

Referring now to the drawings, wherein the showings are for purposes of illustrating one or more exemplary embodiments, FIG. 1 shows a prior art wastewater sealing assembly 10 including a wastewater structure 12 defining a pipe receiving aperture 14, a pipe 16 received in the aperture 14, and an annular seal or gasket 18 disposed within the aperture 14 for radially sealing between the wastewater structure 12 (e.g., a concrete wet well) and the pipe 16. The prior art annular seal 18 of the illustrated wastewater sealing assembly 10 is of the type that includes an outer radial portion 20 embedded in the structure 12 (e.g., during a precast operation to form the structure 12) and an inner radial portion 22 in sealing engagement with the pipe 16 received in the aperture 14.

As is known and understood by those skilled in the art, conventional sealing assemblies, such as the illustrated sealing assembly 10, rely on deflection and/or compression of the annular seal 18, and particularly of the inner radial portion 22, to effect the sealing action between an outside diameter 24 of the pipe 16 and the inside surface 26 of the aperture or opening 14. The prior art seal 18 can be made of a resilient material (e.g., rubber) and can include one or more annular cavities defined within the inner radial portion 22 to produce a mechanical softness that reduces the coupling force and enhances the sealing surface characteristics between the seal 18 and the pipe 16.

Provided that the pipe 16 has a uniform and concentric dimension, the sealing arrangement 10 is usually effective. More specifically, the prior art annular seal 18 has heretofore been effective at sealing with the pipe 16 when the pipe has a smooth, uniform and concentric outside diameter. When the pipe outside diameter is not smooth, uniform, and/or concentric, the seal 18 is more prone to failure, which undesirably leads to infiltration and/or ex-filtration of water from the wastewater system. An adequate sealing effect also occurs with the conventional seal 18 when used with a pipe that is formed of PVC or PE but only when the pipe maintains a smooth and uniform diameter and has been properly bedded, which ensures that the outside diameter does not change or deflect over time due to movement, such as ground settlement. A disadvantage of the sealing assembly 10 is that the tolerance of pipes with which it is usable is somewhat limited, as is the amount of angular deflection that can be realized between the pipe 16 and the concrete structure 12, for example.

With reference now to FIG. 2, an improved sealing assembly 40 is illustrated for a liquid conveying structure or first associated structure, such as a wastewater structure. The assembly includes an improved annular seal or gasket 42. For ease of description, this item will be termed "seal" herein although all of a gasket, seal, or packing employed between two parts to retard the escape of fluid is intended to be covered by the term "seal." Like the sealing assembly 10, the sealing assembly 40 includes the wastewater structure 44 defining a receiving aperture 46 and a second associated structure or pipe 48 received in the aperture 46. The wastewater structure 44 can be, for example, a concrete structure, a manhole, a wet well, etc. As shown, the seal 42, which seals between the structure 44 and the pipe 46, is disposed within the opening or aperture 46 for radially sealing between the structure 44 and the pipe 48.

Figure 6:
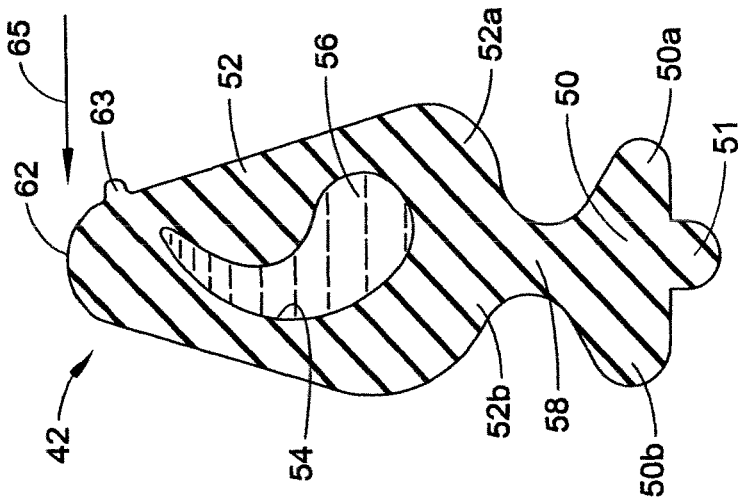
FIG. 6 is an enlarged cross sectional view of the improved annular seal of FIG. 2.
Figure 5B:
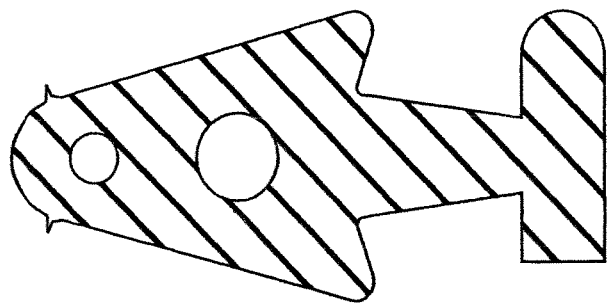
FIGS. 5A-5B are cross sectional views of prior art annular seals for sealing between wastewater structures and pipes received therein.
Figure 5A:
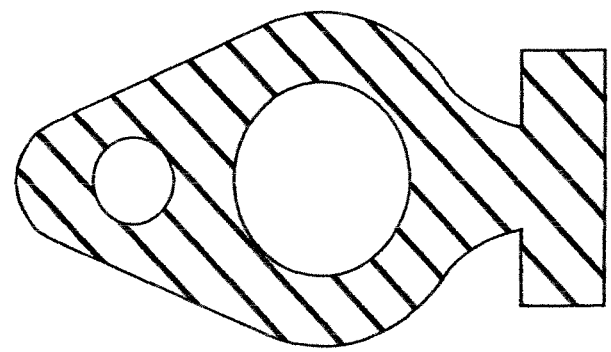

The seal 42, which includes an outer radial portion or first portion 50 embedded in the structure 44, protrudes into the aperture 46 defined in the structure 44. The first portion 50 can include a protrusion 51 (FIG. 6). The seal 42 further includes an inner radial portion or second portion 52 in sealing engagement with the pipe 48. The inner radial portion 52 defines an internal cavity 54 in which a fluid or gel type material 56 is disposed. More particularly, the internal cavity 54 contains the fluid or other visco-elastic dynamic core material 56, which can be a substantially incompressible fluid or a gel. The fluid is ideally stable in that it does not freeze or expand thermally under normal environmental conditions which are expected to be encountered in the field. The fluid is movable within the cavity 54 to provide a dynamic seal that maintains circumferential sealing pressure with the pipe 48, as will be described in more detail below. Also, the fluid can be self-sealing, as will be described below.

With additional reference to FIG. 6, the annular seal 42 also includes a relatively thin web or web portion 58 disposed or extending between and connecting the outer radial portion 50 and the inner radial portion 52. As will be described in more detail below, this allows the inner radial portion 52 to move axially relative to the outer radial portion 50 when the pipe 48 is inserted into the aperture 46 of the structure 44. As shown, the web 58 has a cross-sectional thickness that is less than a cross-sectional thickness of either the outer radial portion 50 or the inner radial portion 52 which promotes the flexibility of the web. The web 58 spaces the inner radial portion 52 from the structure 44 in which the outer radial portion 50 is embedded to permit axial movement of the inner radial portion 52 relative to the outer radial portion 50 for accommodating insertion of the pipe 48. Such movement is particularly beneficial when the pipe 48 is oversized more than normal relative to an opening or aperture 60 defined by distal radial end 62 of the seal 42 as embedded in the structure 44 (see FIG. 2) or when the pipe is angularly displaced relative to the wastewater structure. It sometimes happens that the pipe or conduit 48 is more oversized than is normal for an opening of a given diameter in the structure 44. If this occurs, the profile of the seal 42 can extrude down the taper 72 of the structure 44 (see FIGS. 2 and 4A) in order to accommodate such a pipe.

Figure 4A:
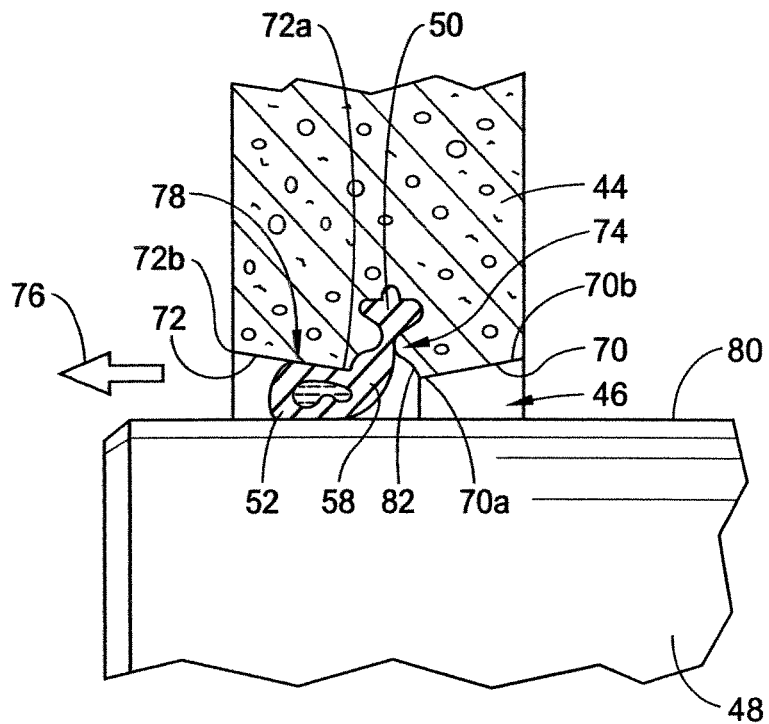
FIG. 4A is a schematic view, partially in cross section, of a pipe being inserted into an aperture of a wastewater structure causing the annular seal embedded therein to move slightly axially as the pipe is inserted.

As shown in the illustrated embodiment of FIG. 6, the seal 42 can have an asymmetrical profile or cross sectional shape, which better accommodates seal movement as the pipe 48 is introduced into the structure 44 while maintaining a fluid-tight seal with a pipe. In particular, the outer radial portion 50 can include foot portions 50a, 50b that are asymmetric relative to one another. For example, foot portion 50b can be thickened relative to foot portion 50a. However, the protrusion 51 can be placed on the axis of the seal 42 and can be symmetrical in shape. When embedded in the structure 44, the thickened foot portion 50a is positioned so as to face the direction from which the pipe 48 is meant to be inserted (FIG. 4A). The inner radial portion 52 can also include asymmetric portions or sections. In particular, in the seal 42 of FIG. 6, a base of the inner radial portion 52, which is adjacent the web 58, can include thickened section 52a. This section 52a is thickened and asymmetric relative to a section 52b of the base disposed on an opposite side of the web 58.

With continued reference to FIG. 6, a bump 63 is located on the seal inner radial portion 52 along one side surface of the seal. The bump or insertion indicator serves two purposes. First, it serves to indicate the direction from which the pipe should be inserted into the aperture surrounded by the seal 42. Second, the bump acts as a wiper to keep the lubricant applied to the seal or the pipe in place when inserting a pipe end past the seal. The lubricant eases coupling pressure between the pipe and the seal. The direction of pipe insertion is indicated by arrow 65. It should be appreciated that the insertion indicator can have a variety of known shapes. It is apparent that both the foot or outer radial portion section 50a and the inner radial portion section 52a in the direction of pipe insertion is different from the foot or outer radial portion 50b and inner radial portion 52b in the direction opposite to the direction of normal pipe installation.

Figure 4B:
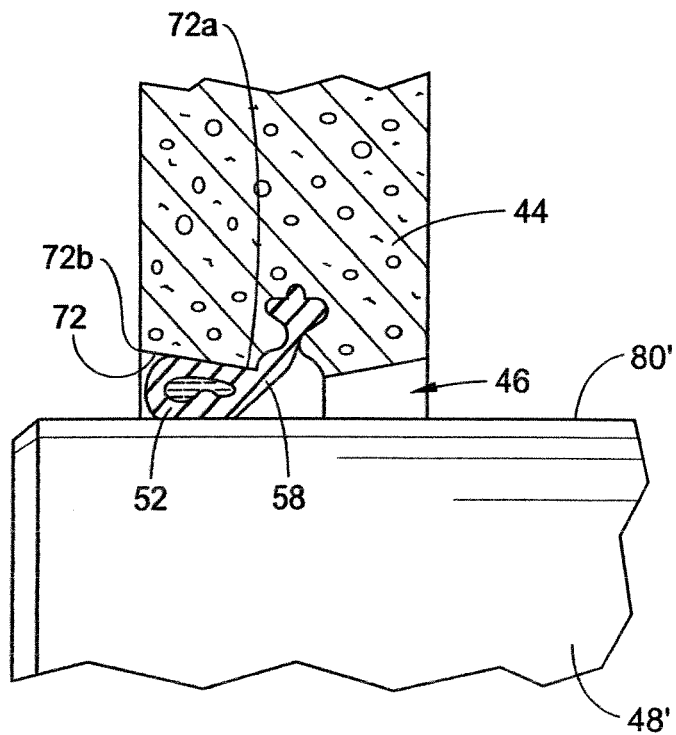
FIG. 4B is a schematic view, partially in cross section, of an oversized pipe being inserted into an aperture of a wastewater structure showing a web portion of the improved annular seal stretching to accommodate the oversized pipe.

The non-symmetrical design of the inner radial portion 52 lowers the coupling force necessary in order to insert the pipe or similar structure in a preferred direction into the opening defined by the seal as illustrated, e.g., in FIGS. 4A and 4B. However, the non-symmetrical design illustrated in FIG. 6 can seal in either direction, although the sealing force required when the seal is installed backwards or used in reverse, i.e., is a mirror image of FIG. 6, in relation to the direction that the pipe or other structure will be inserted into the opening, necessitates an increase in the coupling force. More particularly, the coupling force increases by about 30-40 percent if the seal is used in reverse.

When the pipe is inserted in its normal direction as is illustrated by arrow 76 in FIG. 4A, the cavity 54 assumes somewhat of a figure eight configuration, as is evident from FIGS. 4A and 4B. Expansion is thus allowed to take place across the full length of the sealing surface. On the other hand, if the pipe is inserted in the reverse direction, i.e., opposite the direction of arrow 76, the cavity configuration is different. For a pipe inserted in the reverse direction, the cavity configuration becomes somewhat linear. In this instance, the front portion of the cavity closes off completely, leaving the gel or fluid to influence only the rear portion of the cavity. Put another way, the seal profile hinges at its midpoint, closing off the top portion of the cavity, adjacent the seal tip.

However, an asymmetrical gasket does have the disadvantage that it needs to be oriented in one preferred direction when it is cast in place in the associated structure. Another difficulty with an asymmetrical gasket is that it provides a lower coupling force in the preferred direction in comparison to the symmetrical gasket or seal designs disclosed herein.

By this arrangement, the thickened portion 52a is also disposed on an opposite side of the web than is the thickened foot portion 50a (i.e., the thickened portions 50a, 52a are cattycorner relative to one another). When embedded in the structure 44, the thickened portion 52a is positioned so as to face away from the pipe 48 being inserted (FIG. 4A) and forms a pivot area of the seal 42 when the pipe 48 is installed. It should also be apparent that the internal cavity 54 is asymmetrical in shape. The cavity illustrated in FIG. 6 is in the form of an upside down comma or a tear drop. It has been found that the tear drop cavity allows a better sealing of the assembly against a pipe or similar structure than does a symmetrical cavity.

It has also been found that the protrusion 51 is beneficial for more securely mounting or embedding the outer radial portion 50 of the seal in the structure 44. As mentioned previously, the protrusion 51 can be located approximately along the centerline of the seal 42. Of course, other designs of the protrusions are also feasible.

Another benefit of the gasket design shown in FIG. 6 is that it has no sharp corners. This form of the gasket allows the gasket to be more easily extruded, and, more easily spliced into an annular shape. More particularly, the splice of the two gasket ends can be lined up more easily and there is less opportunity for imperfections at the splice.

The annular seal 42, particularly the inner and outer radial portions 50, 52 and the web 58, can be formed of a resilient material, such as rubber, or any compound formulated for wastewater applications, for example. The fluid 56 can be a substantially incompressible fluid or gel, such as a self-sealing gel, that reacts to the pipe 48, including to deflections to the pipe 48, by moving through the cavity 54 to areas where loss of compression exists due to dimensional change and increases a volume of the outer radial portion 50 at such areas. In one embodiment, the fluid 56 exhibits visco-elastic behavior due to its composition of fibers, binders, polymers and congealing agents, which can all be environmentally friendly. The fibers and the congealing agents can provide the self-sealing function, which prevents any material escape through absorption, minor punctures, tears or the like. Viscous materials generally resist shear flow and strain linearly with time when a stress is applied, whereas elastic materials generally strain instantaneously when stretched and just as quickly return to their original state once the stress is removed. Viscoelastic materials have elements of both of these properties and, as such, exhibit time dependent strain. Such fluids and gels are known in the art and are available from a number of suppliers.

By way of example, as shown in FIGS. 2 and 3, the fluid 56 moves to an upper side of the cavity 54 in the seal 42 when a pipe 48 is deflected downward as indicated by arrow 64 in FIG. 2. This increases a volume of the cavity 54 and the inner radial portion 52 at the upper side of the seal 42 allowing the seal 42, and particularly the inner radial portion 52, to maintain an effective seal with the pipe 48. This is in contrast to the sealing action between the prior art seal 18 and the pipe 16 when the pipe 16 is deflected downward as indicated by arrow 30 in FIG. 1. Accordingly, due to the cross-sectional profile of the seal 42, including the cavity 54 with the substantially incompressible fluid or gel 54 introduced therein, the seal 42 has the ability to accommodate deflection of the pipe 48 by transporting the liquid or gel 56 to an area where a loss of compression would otherwise occur. Such loss of compression could be caused by a dimension change in the pipe 48 or a deflection of the pipe 48. To accommodate such challenges, the seal 42 according to the present disclosure increases the space or volume the profile of the seal occupies. In addition, the seal 42 can effectively seal with a pipe that "falls out of round," such as by up to approximately 5% of the outside diameter. As will be appreciated by those skilled in the art, the dynamic seal 42 also lessens the demand for the outside diameter of the pipe received therein (e.g., pipe 48) to be exactly concentric.

With reference to FIGS. 4A and 4B, the structure 44 can include one or more axial tapers 70, 72 adjacent a location 74 at which the outer radial portion 50 is embedded in the structure 44. As shown, one advantage of the thickness of the web 58 being less than a thickness of the outer radial portion 50 is that this arrangement allows the inner radial portion 52 to travel down the axial taper 72 (i.e., the axial taper downstream relative to a direction of insertion of the pipe 48, which is indicated by arrow 76). In particular, the inner radial portion 52 is allowed by the web 52 to travel down the axial taper 72 of the structure 44 to a location 78 where adequate annular space is available for sealing against the pipe 48. As shown, an increasing amount of annular space is provided as the taper 72 moves farther apart relative to the outer diameter 80 of the pipe 48.

As shown in FIGS. 4A and 4B, the axial tapers 70, 72 (also referred to herein as axial tapered surfaces) define the pipe receiving aperture 46. Each of the axial tapers 70, 72 has a first end or inner section 70a, 72a adjacent the location 74 at which the outer radial portion 50 is embedded in the structure 44 and a second end or outer section 70b, 72b spaced apart axially from the location 74. The axial tapers 70, 72 each increase a diameter of the pipe receiving apertures 46 from their respective first sections 70a, 72a to their respective second sections 70b, 72b. A recess 82 can be defined radially into the structure 44 at the location 74 between the tapers 70, 72, which can facilitate the axial movement of the inner radial portion 52 along a taper 72.

As illustrated, the annular seal 42 is axially displaced by the pipe 48 when the pipe is received in the pipe receiving aperture 46 and accommodated toward the second section 72b. This is particularly advantageous in the situation where a pipe is received in the pipe receiving aperture having an oversized diameter. For example, as illustrated in FIG. 4B, pipe 48' is illustrated having outside diameter 80' that is greater than the outside diameter 80 of pipe 48 in FIG. 4A. In this situation, the web 58 further stretches and allows the inner radial portion 52 to further move axially along the axial taper 72 toward the axial taper second section 72b for being accommodated between the structure 44 and the outside diameter 80' of the pipe 48'. As shown, the taper 72 as it extends from the inner end or first section 72a to the outer end or second section 72b provides the pipe receiving aperture 46 with an increasing diameter. The thin, thickness controlled web 58 of the seal 42 allows the seal to automatically adjust and position itself in a location where adequate annular space is available for sealing and maintaining a watertight seal with the pipe 48'. This allows the seal 42, and the wastewater sealing assembly 40, to be usable with a wider range of pipe diameters and tolerances.

The tolerances for a larger size seal can be on the order of plus or minus one half inch. Therefore, the top to bottom variance of an annular seal can be on the order of plus or minus one inch. In this way, pipes, conduits or other associated structures extending through the seal or gasket can vary in diameter by up to approximately one inch and still be accommodated successfully and sealed against by the liquid filled seal or gasket disclosed in FIG. 6. The design illustrated therein provides enough elastomeric material that the seal or gasket does not tear and yet provides the maximum amount of fluid or gel in the opening so as to allow the fluid to flow to those areas of the seal most in need and thereby successfully provide a liquid tight fit against a pipe or other structure or associated member extending through the opening in the annular seal.

FIGS. 7A-7G illustrate a variety of alternative sealing structures that could replace the seal 42 in the wastewater sealing assembly 40. In particular, the illustrated seals of FIGS. 7A-7G provide a variety of configurations, some of which employ alternative inner radial portions (i.e., the portion that is embedded within the wastewater structure or other associated member), various inner radial configurations, and/or various designs for the annular cavities defined within the inner radial portion. Some of these seals (e.g., at least those depicted in FIGS. 7B and 7C) are such that a volume of the internal cavity defined in the inner radial portion is greater than a volume of the inner radial portion defining the seal. That is, at a cross section through the inner radial portion, an area of the cavity is greater than an area of a material forming the inner radial portion of the seal.

Figure 7C:
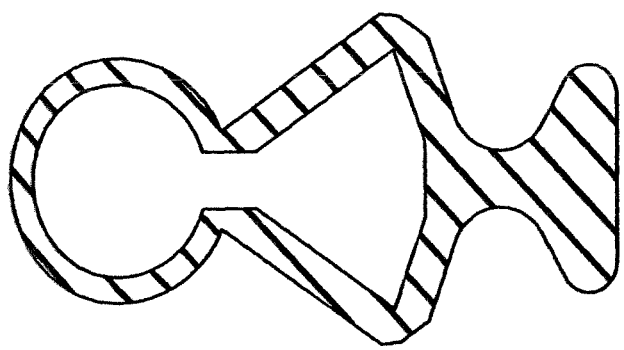
Figure 7B:
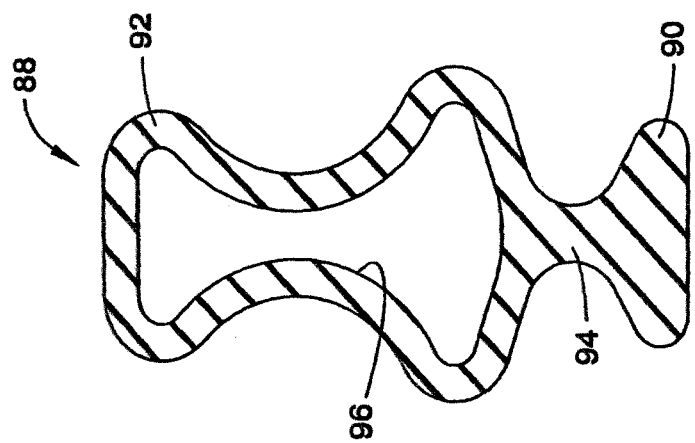
Figure 7A:
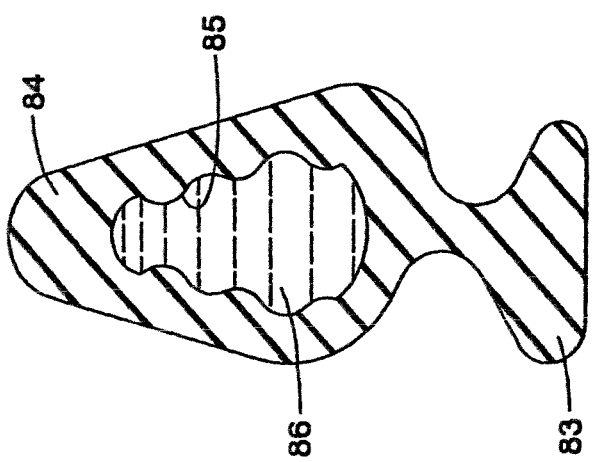

Specifically, FIG. 7A illustrates a seal design in which an outer radial portion or foot 83 is embedded in the waste water structure or associated structure while the inner radial portion 84 extends into an opening defined in the structure. As in the design of FIG. 6, an annular seal or gasket is thus provided defining an opening through which a pipe or similar associated structure can selectively extend. Defined in the inner radial portion is a cavity 85 which accommodates a fluid or gel 86. In the design illustrated in FIG. 7A, the volume of the cavity 85 can approach the volume of the elastic material which comprises the inner radial portion 84. The design illustrated in FIG. 7A is also asymmetrical such that the outer radial portion or foot 83 and inner radial portion 84 are more offset from each other than the asymmetrical design illustrated in FIG. 6. In this embodiment, the cavity 85 is symmetrical, although it can be larger in volume than is the cavity 54 illustrated in FIG. 6.

Referring now to FIG. 7B, in this embodiment, a seal 88 has an outer radial portion 90, that can be symmetrical in design and inner radial portion 92 which is connected to the outer radial portion 90 by a web or web portion 94 and the inner radial portion 92 defines a cavity 96. In the depicted seal of FIG. 7B, however, the cavity 96 has a volume that is greater than is a volume of the inner radial portion 92 of the seal material surrounding the cavity 96. Thus, at many cross sections through the inner radial portion 92, an area of the cavity 96 is greater than an area of the material of the inner radial portion 92. Though not shown, in this figure a fluid or gel, such as the substantially incompressible fluid or gel 56 or 86, is accommodated in the cavity 96.

One advantage of an arrangement where the cavity has a greater volume than the inner radial portion is that less material is required to form the inner radial portion. In other words, the volume of material used to form the inner radial portion is significantly reduced, particularly as compared to conventional designs, and this material can be replaced with the substantially incompressible, self-sealing fluid that can be introduced into the cavity. When the seal, and particularly the inner radial portion, is formed by a polymer such as rubber, reducing the material needed to form the inner radial portion can be advantageous. For example, requiring less material can reduce potential issues with supply and stability in raw materials. Also, the effects of volatile world pricing, such as the pricing of rubber, oil, and/or related chemicals, are reduced (presuming that rubber is more expensive than gel). A further advantage is that the coupling force required for inserting the pipe into the pipe receiving aperture is reduced when the volume of the inner radial portion is likewise reduced. Lower coupling force, whether provided by the reduced volume of material forming the inner radial portion or by the geometry of the web, translates into less installation related tears and punctures. Another advantage is that with more gel the seal 88 (or other like seals) can further flex to better accommodate pipe sizing disparities. In applications where less flex is desired (e.g., due to higher pipe tolerances), the seal shown in FIG. 7A may be appropriate with its relatively smaller cavity.

Any of the seals or gaskets disclosed herein (or similar) could employ modified inner radial portions. For example, the seal 42' of FIG. 7E replaces inner radial portion 50 and web 58 of seal 42 with inner radial portion 50' having a pair of spaced leg portions 50a',50b' extending directly from outer radial portion 52' (i.e., there is no web). These leg portions 50a',50b' can better anchor the seal 42' in a concrete structure and/or cooperate with alternative structures having varying shapes (i.e., other than structure 44). As shown, the outer radial portions 52' can include side indentations 52a' for promoting flexibility if desired, though this is not required. Alternatively, the seals shown in FIGS. 7D and 7G employ a tapered web or intermediate portion in place of straight web 58 of seal 42. Any of the various seal designs illustrated in the drawings herein can be formed by extrusion, as is well known in the art. The seal can be made of any of a number of known elastomeric materials. As is also known, two or more different elastomeric materials can be co-extruded to form the seal.

When used, the fluid 56, which can be a substantially incompressible fluid or gel, can be a liquid material formed of a blend of environmentally friendly fibers, binders, polymers and congealing agents that intertwine and clot punctures, such as those of up to about ¼ inches. For example, the fluid can be a tire sealant, such as those commercially available from a variety of vendors currently in the marketplace. Properties associated with the fluid can be that it flows well, will not freeze at low temperatures or evaporate at high temperatures, does not have any deleterious effects on the material forming the seal inner radial portion and will seal small leaks in the inner radial portion, due to the presence of at least one of fibers and particles in the fluid material.

Further advantages of the seal 42 are that it allows for an increase in the upper and lower nominal pipe diameter tolerance over conventional connectors or seals due to the geometry of the seal 42, particularly when employed in conjunction with the tapering of the pipe receiving aperture 46, which can be about a 10 degree taper. In addition, the seal 42 can handle in excess of 5% deflection in the outer diameter of the pipe being sealed. 5% is the deflection required by ASTM standard F2510 for resilient connectors between reinforced concrete manhole structures and corrugated high density polyethylene drainage pipes. However, the concrete of the wastewater structure can serve as a stiffening element for the seal and can control the dimensions of the hole in which the seal is positioned to reduce the deflection of the seal when a pipe is inserted. This may be advantageous to prevent a loss of sealing around the pipe. The connector or seal 42 also allows for up to 15 degrees omni-directional deflection due to the ability of the connecting web to stretch within the taper of the pipe receiving aperture.

Additional advantages include allowing for fast and easy field installation. More particularly, after the seal 42 and the pipe 48 are optionally cleaned and lubricated, the pipe 48 is simply centered relative to the seal 42 and inserted within the pipe receiving aperture 46. Backfilling around the pipe 48 can be done immediately, thus enhancing project safety and overcoming the typical problems of water, running sand and other unstable trench conditions that result when steps are taken with conventional designs for limiting settling.

Figure 8:
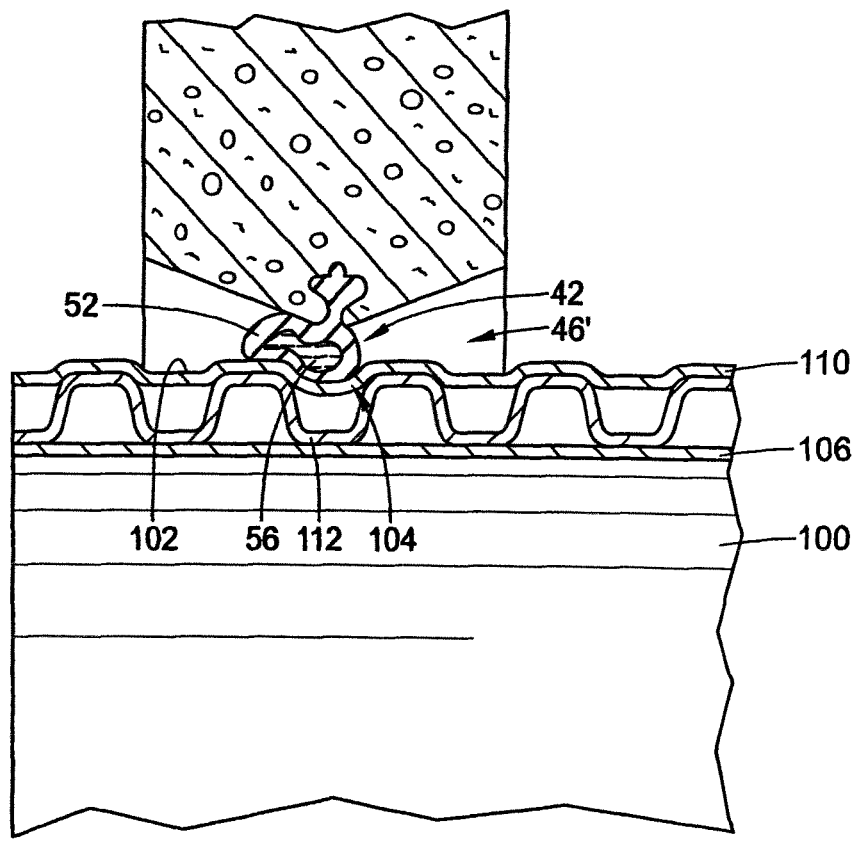
FIG. 8 is a cross sectional view of the improved annular seal of FIG. 2 sealing with a corrugated exterior surface of a pipe received within an aperture of a wastewater structure in which the seal is embedded.

Turning to FIG. 8, the seal 42 is shown sealing with a pipe 100 having a flexible outer surface 102 that deforms under compression by the seal 42. The fluid 56 within the inner radial portion 52 expands the inner radial portion of the seal 42 in areas where the pipe outer surface deforms (such as at area 104) to maintain a watertight seal with the pipe 100. More specifically, the illustrated pipe 100 includes an inner pipe member 106 annularly surrounded by a corrugated pipe member 108, which is annularly surrounded by outer pipe member 110 defining flexible outer surface 102. As illustrated, the seal 42 deflects the outer pipe member 110, and particularly the outer surface 102, into a valley portion 112 of the corrugated pipe member 108 at the location where the seal 42 engages and seals with the pipe 100. The fluid 56 enlarges the inner radial portion 52 at this location to continue providing an effective seal with the pipe 100.

Figure 9:
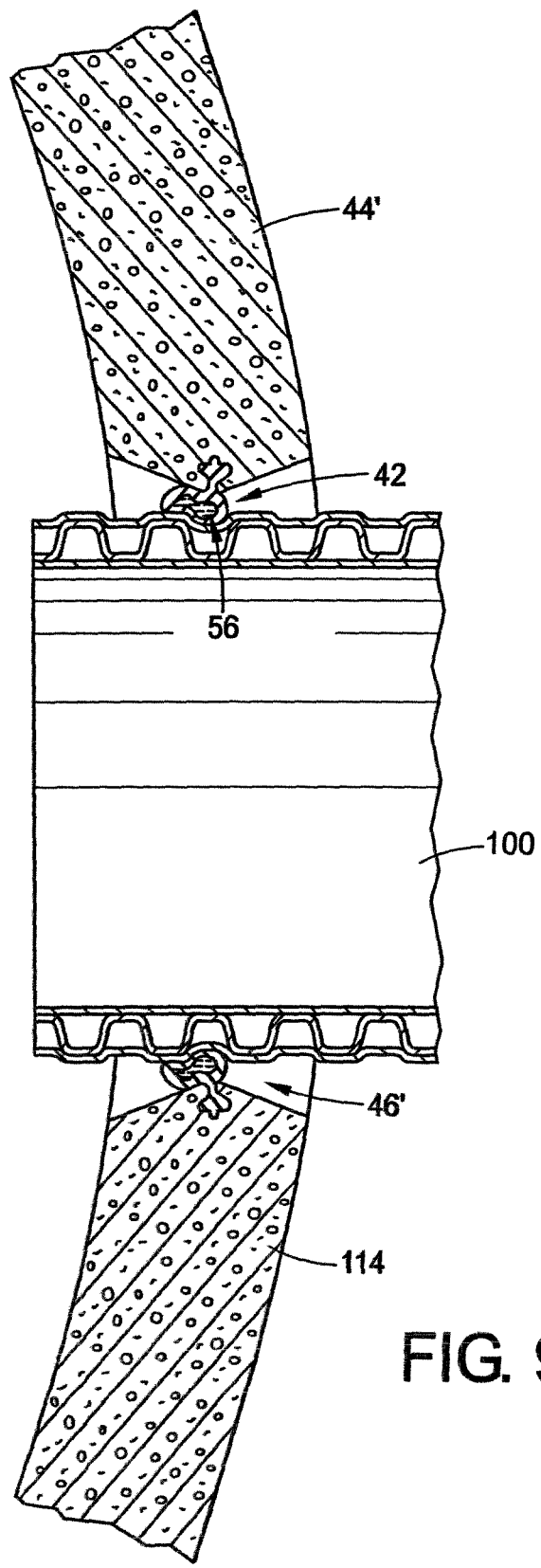
FIG. 9 is a further cross sectional view of the wastewater sealing assembly of FIG. 8 showing the aperture defined within a curved wall of the wastewater structure.

With reference to FIG. 9, the seal 42 is effective for sealing between a wastewater structure 44' having a curved wall 114 and a pipe, such as pipe 100. Pipe receiving aperture 46' is defined through the curved wall 114 of the structure 44', but the seal 42 continues to provide effective sealing action with the pipe 100. In contrast to prior art designs which are suitable for only flat, straight wall configurations, the fluid 56 in the cavity 54 causes the profile of the seal 42 to self-align in a flat configuration by seeking the path of least resistance and thereby provides an effective seal with the pipe 100.

Figure 10:
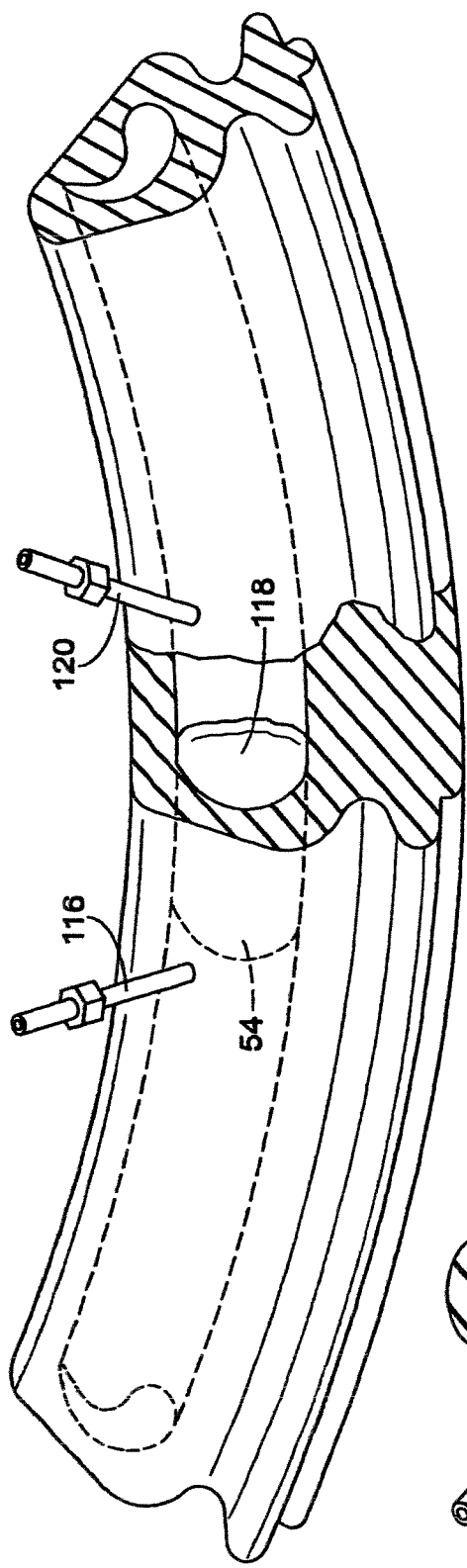
FIG. 10 is an enlarged partially cross-sectional view of the seal of FIG. 2 illustrating a substantially incompressible fluid or gel being introduced into a cavity of the seal at a first location, while a gas is simultaneously removed from the cavity at a second location.
Figure 11:
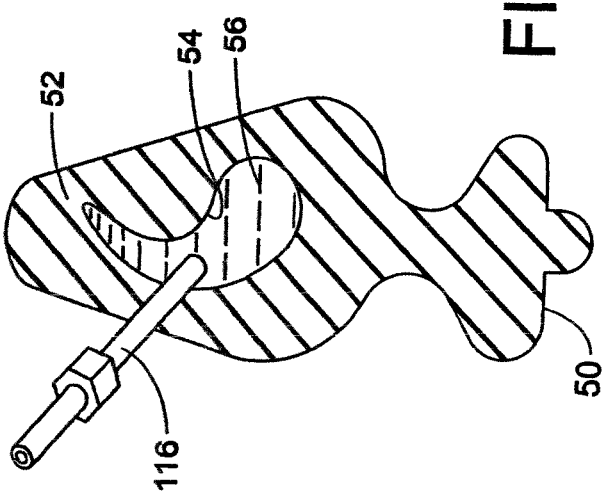
FIG. 11 is a further cross-sectional view of the seal of FIG. 11 with the substantially incompressible fluid or gel being introduced into the cavity of the annular seal.

With additional reference to FIGS. 10 and 11, a method of making a wastewater sealing assembly, such as sealing assembly 40, will now be described. First, the annular seal 42, which includes the cavity 56 defined in inner radial portion 52, is provided. In particular, the seal 42 can be formed by extrusion. Upon extrusion only air or a like gas is present in the cavity of the seal, and the seal is linear. Then, its ends are spliced together to configure the seal 42 as an annular member. Prior to casting, gel or fluid is introduced into the cavity 56. This normally takes place at the gasket manufacturing facility. During the casting of the wastewater structure 44, the radial outer portion 50 of the annular seal 42 can be embedded in an opening section, such as at location 74, of the wastewater structure 44 that defines the pipe receiving aperture 46. As already described, the inner radial portion 52 that extends radially inwardly from the opening section or location 74.

The fluid 56, which can be a substantially incompressible fluid or gel as already described herein, can then be introduced into the cavity 54 defined by the inner radial portion 52. Simultaneous with the introduction of the fluid or gel 56 into the cavity 54, gas then resident in the cavity 54, such as air, can be removed from the cavity 54. More particularly, introduction of the fluid or gel 56 can occur through a first needle 116 which is inserted on one side of a splice 118 of the seal 42 (connecting the two ends of the seal together) and removal of the gas from the cavity 54 by pulling a vacuum can occur through a second needle 120 inserted on a second, opposite side of the splice 118. The vacuum pulled via the second needle insures that the fluid or gel fills the bore or cavity 54 in the gasket fully, leaving no gas pockets in the cavity. When the fluid 56 is a self-sealing gel, the insertion holes caused by the needles 116, 120 can be effectively sealed by the fluid 56 itself.

During a field installation, pipe 48 (or some other pipe, e.g., pipe 48') can be inserted within the pipe receiving aperture 46. The annular seal 42 can seal against the pipe 46 with the substantially incompressible fluid or gel 56 moving through the cavity 54 to facilitate this sealing with the pipe 48. Also, the seal 42, and particularly the inner radial portion 52, can axially move along the opening section of the pipe, such as along taper 72. The thin web 58 that connects the inner radial portion 52 to the embedded outer radial portion 50 can fold against the taper 72 as the pipe 48 is inserted into pipe receiving aperture 46. The taper 72 can accommodate the axially moved inner radial portion 52 in a space that increases in size away from the location 74 toward the taper end section 72b.

Among the benefits of the disclosed seal or gasket is that it more easily handles flexible pipe inserted in a structure, such as a concrete manhole or the like. Thus, a pipe, such as the pipe shown in FIGS. 8 and 9 for example, can be more easily accommodated by the disclosed seal or gasket designs than by conventional gasket or seal designs. In other words, the disclosed structures provide a better watertight joint than the known designs.

The invention has been described with reference to several preferred embodiments. Obviously, modifications and alterations will occur to others upon a reading and understanding of this specification. It is intended to include all such modifications and alterations in so far as they come within the scope of the appended claims or the equivalents thereof.

The invention claimed is:

1. A continuous seal for sealing between a first associated member and a second associated member, comprising:
    a first radial portion embedded in the first associated member and a second radial portion protruding away from the first associated member;
    a web portion disposed between and connecting the first radial portion and the second radial portion, the web portion having a cross-sectional thickness that is less than a cross-sectional thickness of each of said first radial portion and said second radial portion;
    an annular cavity defined within said second radial portion, said cavity being surrounded by a material of said second radial portion, said cavity, when viewed in cross-section, being comma-shaped and asymmetrical about a central radial axis of the web portion before a contact of the seal with the second associated member, the comma shaped cavity including curved side walls and a tapered tail portion extending from a concave head portion and wherein both said first and second radial portions are asymmetrical about the central radial axis of said web portion; and
    a viscoelastic fluid or gel disposed within said cavity and movable within said cavity to provide a dynamic seal with the second associated member.

2. The continuous seal of claim 1 wherein said fluid or gel comprises a substantially incompressible fluid or gel that reacts to deflections of the associated pipe by moving through said cavity to areas where loss of compression exists due to dimensional change and increases a volume of said second radial portion at said areas.

3. The continuous seal of claim 1 wherein said second radial portion includes a first foot portion located on a first side of the radial centerline of said web portion and a second foot portion located on a second side of said radial centerline.

4. The continuous seal of claim 1 wherein said first radial portion includes a first section located on a first side of the radial centerline of said web portion and a second section located on a second side of said radial centerline, said first and second sections being asymmetrical including a relatively thicker portion on the first section and a relatively thinner portion on the second section.

5. The continuous seal of claim 1 wherein said seal further comprises an indicator located on a single face of the seal to show which direction the second associated member should be preferably inserted into an opening defined by the seal.

6. The continuous seal of claim 1 wherein the cavity before a contact of the seal with the conduit, includes a relatively narrow portion and a relatively wide portion.

7. The continuous seal of claim 1 wherein the cavity further includes an undulation located on one side wall thereof.

8. A sealing assembly for a liquid conveying system, comprising:
    a structure defining a conduit receiving aperture;
    a conduit received in said aperture; and
    an annular seal disposed within said aperture for radially sealing between said structure and said conduit, the seal including an outer radial portion embedded in said structure, an inner radial portion in sealing engagement with said conduit and a relatively thin web extending between and connecting said outer radial portion and said inner radial portion, the web allowing said inner radial portion to move axially relative to said outer radial portion when said conduit is inserted into said conduit receiving aperture of said structure, said inner radial portion defining an annular internal cavity containing a substantially incompressible viscoelastic fluid or gel, said internal cavity in cross-section, before a contact of the seal with the conduit, including opposed concave surfaces and at least one undulation located therebetween and wherein said outer radial portion includes a first foot portion located on a first side of a radial centerline of said web and a second foot portion located on a second side of said radial centerline of said web, wherein said first and second foot portions are asymmetrical about the radial centerline of the web and wherein said inner radial portion includes a first section located on a first side of the radial centerline of said web and a second section located on a second side of said radial centerline, said first and second sections being asymmetrical about the radial centerline of the web.

9. The sealing assembly of claim 8 wherein said structure includes an axial taper adjacent a location at which said outer radial portion is embedded in said structure, a thickness of said web being less than a thickness of said outer radial portion allowing said inner radial portion to travel down said axial taper of said structure to a location where adequate annular space is available for sealing against said pipe.

10. The sealing assembly of claim 8 wherein said outer radial portion further comprises a protrusion.

11. The sealing assembly of claim 10 wherein said structure includes an axial tapered surface defining said conduit receiving aperture, said axial tapered surface having a first section adjacent a location at which said outer radial portion is embedded in said structure and a second section spaced apart from said location, said axial tapered surface increasing a diameter of said pipe receiving aperture from said first section to said second section, said annular seal axially displaced by said conduit when said conduit is received in said conduit receiving aperture and accommodated toward said second section.

12. The sealing assembly of claim 8 wherein a volume of said internal cavity is greater than a volume of a material comprising said inner radial portion of said annular seal.

13. The sealing assembly of claim 8 wherein said conduit has a flexible outer surface that deforms under compression by said annular seal, said substantially incompressible fluid or gel expanding said inner radial portion of said annular seal in areas where said conduit outer surface deforms to maintain a watertight seal with said conduit.

14. The sealing assembly of claim 8 wherein said annular seal further comprises an indicator located on a single face of the inner radial portion to show which direction the conduit should be preferably inserted into an opening defined by the seal.

15. A continuous seal for sealing between a first associated member and a second associated member, comprising:
   a first radial portion embedded in the first associated member, a second radial portion protruding away from the first associated member and a web portion disposed between and connecting the first and second radial portions, the web portion having a cross-sectional thickness that is less than a cross-sectional thickness of either the first or the second radial portions;
   an annular cavity defined with said second radial portion, said cavity being surrounded by a material of said second radial portion;
   a viscoelastic fluid or gel disposed within said cavity and movable within said cavity to provide a dynamic seal with the second associated member;
   wherein the second radial portion is asymmetric about a radial central axis of the web portion such that a first side of the second radial portion is thicker than is a second side thereof such that the second radial portion is adapted to lower a coupling force necessary to insert the second associated member in a first direction into an opening defined by the continuous seal than in a second, opposite, direction;
   wherein the first radial portion is asymmetric about the central radial axis of the web; and
   wherein the cavity, before a contact of the seal with the second associated member, is asymmetric about the radial central axis of the web, the cavity being comma-shaped and including concave radially inner and outer ends and an undulation in a side wall thereof.

16. The seal of claim 15 wherein the asymmetry of the first radial portion is oriented opposite to the asymmetry of the second radial portion.

17. The seal of claim 15 wherein a first side of the first radial portion is thinner than is a second side thereof.

18. The continuous seal of claim 15 wherein said seal further comprises an indicator located on a single face of the second radial portion to show which direction the second associated member should be preferably inserted into an opening defined by the seal.

* * * * *